United States Patent
Kayode

(10) Patent No.: US 10,191,182 B2
(45) Date of Patent: Jan. 29, 2019

(54) ACCURACY OF WATER BREAK-THROUGH TIME PREDICTION

(71) Applicant: Saudi Arabian Oil Company, Dhahran (SA)

(72) Inventor: Babatope Kayode, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 460 days.

(21) Appl. No.: 14/955,799

(22) Filed: Dec. 1, 2015

(65) Prior Publication Data
US 2017/0153357 A1    Jun. 1, 2017

(51) Int. Cl.
| | | |
|---|---|---|
| G06F 17/50 | (2006.01) | |
| G01V 99/00 | (2009.01) | |
| G06F 17/11 | (2006.01) | |
| G09B 23/40 | (2006.01) | |

(52) U.S. Cl.
CPC ............ G01V 99/005 (2013.01); G06F 17/11 (2013.01); G06F 17/5009 (2013.01); G09B 23/40 (2013.01); *G06F 2217/16* (2013.01)

(58) Field of Classification Search
CPC ............................. G06F 17/5018; E21B 49/00
USPC ......................................................... 703/2, 10
See application file for complete search history.

(56) References Cited

U.S. PATENT DOCUMENTS

| | | | |
|---|---|---|---|
| 7,324,929 B2 | 1/2008 | Huh et al. | |
| 8,350,851 B2 | 1/2013 | Flew et al. | |
| 8,489,374 B2 | 7/2013 | Dogru | |
| 8,510,089 B2 | 8/2013 | Rai et al. | |
| 8,532,969 B2 | 9/2013 | Li et al. | |
| 8,855,986 B2* | 10/2014 | Castellini | G01V 99/00 703/10 |
| 9,058,445 B2* | 6/2015 | Usadi | G06F 17/5009 |
| 2008/0167849 A1 | 7/2008 | Hales et al. | |
| 2010/0312535 A1 | 12/2010 | Chen et al. | |
| 2013/0275106 A1* | 10/2013 | Li | G01V 11/00 703/10 |

(Continued)

OTHER PUBLICATIONS

M. A. Crotti, Scaling Up of Laboratory Relative Permeability Curves. An Advantageous Approach Based on Realistic Average Water Saturations 2001, SPE Society of Petroleum Engineers, pp. 1-7.*

(Continued)

*Primary Examiner* — Andy Ho
(74) *Attorney, Agent, or Firm* — Fish & Richardson P.C.

(57) ABSTRACT

The present disclosure describes methods and systems, including computer-implemented methods, computer program products, and computer systems, for improving water break-though time predictions. One computer-implemented method includes obtaining, by a hardware data processing apparatus, a plurality of initial relative permeability data; determining, by the hardware data processing apparatus, viscosity data; determining, by the hardware data processing apparatus, a flood-front saturation point based on the viscosity data and the initial relative permeability data; and generating, by the hardware data processing apparatus, a plurality of corrected relative permeability data based on the plurality of initial relative permeability data and the critical fractional flow point, wherein the plurality of the corrected relative permeability data are used to simulate water break-through time.

18 Claims, 6 Drawing Sheets

(56) References Cited

U.S. PATENT DOCUMENTS

2015/0019183 A1  1/2015  Suzuki
2015/0039276 A1  2/2015  Maucec
2015/0338550 A1*  11/2015  Wadsley ................. E21B 43/00
                                                          703/2

OTHER PUBLICATIONS

Crotti et al, "Scaling Up of Laboratory Relative Permeability Curves. An Advantageous Approach Based on Realistic Average Water Saturations," Mar. 28, 2001.

Kleppe, "TPG4150 Reservoir Recovery Techniques 2015 Hand-out note 4: Buckley-Leverett Analysis," TPG4150 Reservoir Recovery Techniques, Sep. 24, 2015, pp. 1-9, <http://www.ipt.ntnu.no/~kleppe/TPG4150/BL.pdf>.

International Search Report and Written Opinion issued in International Application No. PCT/US2016/029966, dated Jul. 21, 2016.

AlSofi and Blunt, "Control of Numerical Dispersion in Simulation of Augmented Water Flooding," SPE 129658, Society of Petroleum Engineers, presented at the 2010 SPE Improved Oil Recovery Symposium, Apr. 24-28, 2010, 12 pages.

Buckley and Leverette, "Mechanism of Fluid Displacement in Sands," Society of Petroleum Engineers of AIME, presented at the New York Meeting, Feb. 1941, 10 pages.

Carr and Christier, "Controlling Numerical Diffusion in Reservoir Simulation Using the Flux Corrected Transport," SPE 12235, Society of Petroleum Engineers of AIME, presented at the Reservoir Simulation Symposium on Nov. 15-18, 1983, 8 pages.

Darman et al., "The Development of an optimal Grid-Coarsening Scheme: Interplay of Fluid Forces and Higher Moments of Fine-Scale Flow Data," SPE 93348, Society of Petroleum Engineers Inc., presented at the 2005 Asia Pacific Oil and Gas Conference and Exhibition, Apr. 5-7, 2005, 8 pages.

Fanchi, "Multidimensional Numerical Dispersion," Society of petroleum Engineers of AIME, Feb. 1983, 9 pages.

Jacks et al., "The Modelling of a Three Dimensional Reservoir with a Two Dimensional Reservoir Simulator—The Use of Dynamic Pseudo-functions," Society of Petroleum Engineers of AIME, presented at the SPE-AIME 47th Annual Fall Meeting, Oct. 8-11, 1972, 11 pages.

Kyte and Berry, "New Pseudo Functions to Control Numerical Dispersion," Society of Petroleum Engineers, Aug. 1975, presented at the SPE-AIME 49th Annual Fall Meeting, Oct. 6-9, 1974, 8 pages.

Laprea-Bigott and Morse, "Improved Pressure Response Representation and Reduction of Numerical Dispersion Effects in Reservoir Simulation," SPE 8875, Society of Petroleum Engineers of AIME, American Institute of Mining, Metallurgical and Petroleum Engineers, Inc., presented at the 55th Annual Fall Tehcnical Conference and Exhibition of the Society of Petroleum Engineers of AIME, Sep. 21-24, 1980, 10 pages.

Todd et al., "Methods for Increased Accuracy in Numerical Simulation," Society of Petroleum Engineers, Transactions, vol. 253, Dec. 1972, presented at the SPE 46th Annual Fall Meeting, Oct. 3-6, 1971, 16 pages.

Welge, "A simplified Method for Computing Oil Recovery by Gas or Water Drive," SPE 124-G, Petroleum Transactions, AIME, vol. 195, 1952, presented at the Petroleum Branch Fall Meeting, Oct. 3-5, 1951, 8 pages.

Wheatley, "A version of Two Point Upstream Weighting for use in Implicit Numerical Reservoir Simulators," SPE 7677, American Institute of Mining, Metallurgical and Petroleum Engineers, presented at the 1979 Society of Petroleum Engineers of AIME Fifth Symposium on Reservoir Simulation, Feb. 1-2, 1979, 8 pages.

Yanosik and McCracken, "A Nine-Point Finite difference Reservoir Simulator for Realistic Prediction of Unfavorable Mobility Ratio Displacement," SPE 5734, Society of Petroleum Engineers of AIME, Aug. 1979, presented at the SPE-AIME Fouth Symposium of Numerical Simulation of Reservoir Performance, Feb. 19-20, 1976, 10 pages.

Gulf Cooperation Council Examination Report issued in GCC Application No. GC 2016-31590 dated Oct. 21, 2018, 6 pages.

\* cited by examiner

| Sw | Krw | Kro | muo | 0.594 |
|---|---|---|---|---|
| | | | muw | 0.31 |
| Sw | Krw | Kro | | fw |
| 0.19 | 0 | 1 | #DIV/0! | #DIV/0! |
| 0.2 | 0.001 | 0.9 | 469.697 | 0.002125 |
| 0.24 | 0.0015 | 0.8524 | 296.5701 | 0.003361 |
| 0.29 | 0.0061 | 0.7187 | 61.48838 | 0.016003 |
| 0.34 | 0.0138 | 0.6217 | 23.51132 | 0.040797 |
| 0.3912 | 0.0245 | 0.4912 | 10.46327 | 0.087235 |
| 0.4411 | 0.0383 | 0.3964 | 5.401447 | 0.156215 |
| 0.491 | 0.0551 | 0.3135 | 2.969349 | 0.251931 |
| 0.541 | 0.075 | 0.2419 | 1.683255 | 0.372682 |
| 0.5909 | 0.098 | 0.1812 | 0.964956 | 0.508917 |
| 0.6409 | 0.124 | 0.1307 | 0.550084 | 0.645126 |
| 0.6908 | 0.1531 | 0.0897 | 0.305768 | 0.765833 |
| 0.7408 | 0.1553 | 0.0576 | 0.193565 | 0.837826 |
| 0.7921 | 0.2205 | 0.0336 | 0.079525 | 0.926333 |
| 0.842 | 0.2588 | 0.016 | 0.032265 | 0.968744 |
| 0.9419 | 0.3446 | 0.0014 | 0.00212 | 0.997884 |
| 1 | 1 | 0 | 0 | 1 |

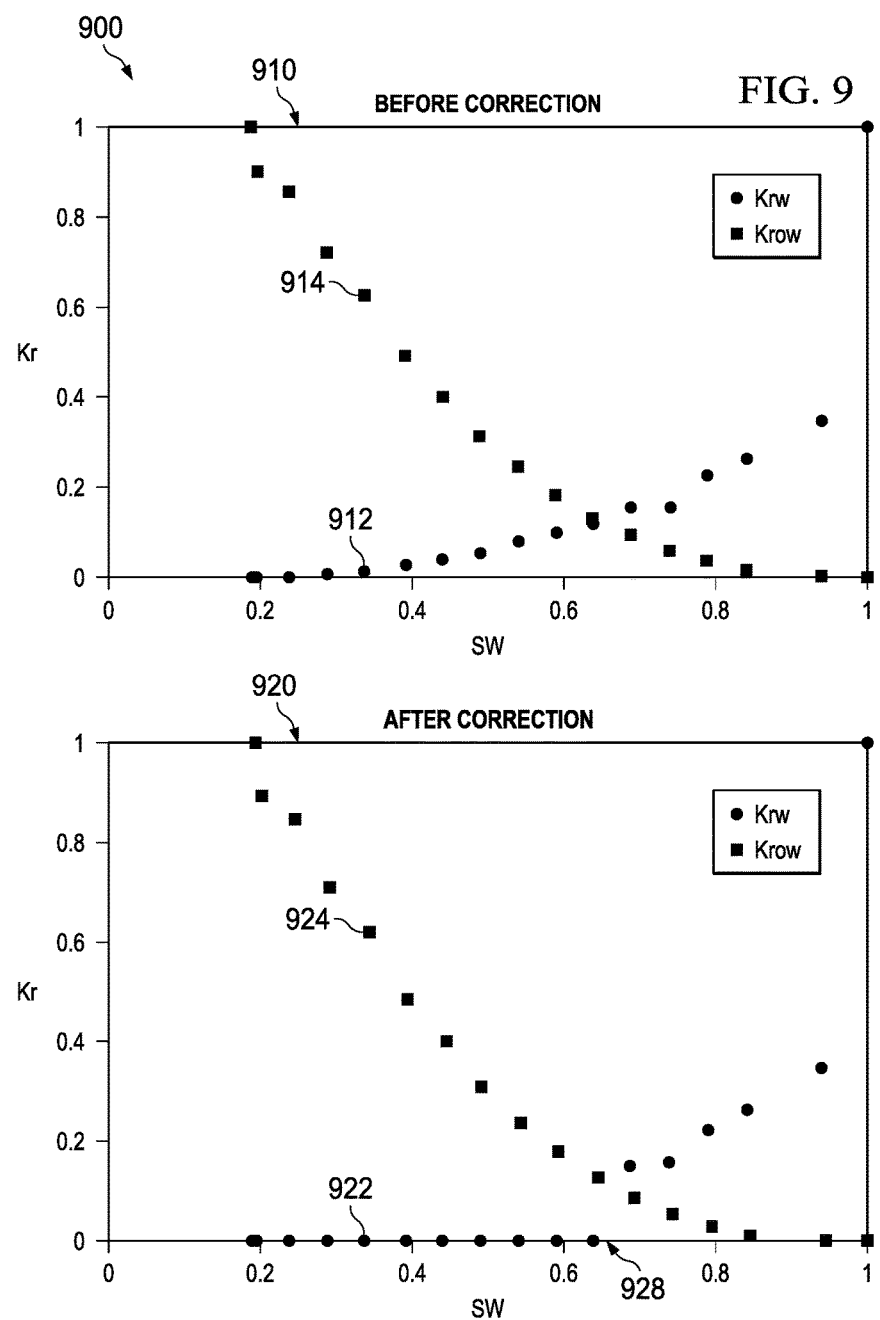

ACCURACY OF WATER BREAK-THROUGH TIME PREDICTION

BACKGROUND

In some cases, in the petroleum industry, field development can be predicted using simulations based on a geomodel that models the geological structure of the field. In some implementations, field-observed pressure and historical production data can be used to compare with the simulated results. The matching between the simulation results and the historical data can be used to calibrate the geomodel.

SUMMARY

The present disclosure describes methods and systems, including computer-implemented methods, computer program products, and computer systems, for improving water break-through time predictions. One computer-implemented method includes obtaining, by a hardware data processing apparatus, a plurality of initial relative permeability data; determining, by the hardware data processing apparatus, viscosity data; determining, by the hardware data processing apparatus, a flood-front saturation point based on the viscosity data and the initial relative permeability data; and generating, by the hardware data processing apparatus, a plurality of corrected relative permeability data based on the plurality of initial relative permeability data and the critical fractional flow point, wherein the plurality of the corrected relative permeability data are used to simulate water breakthrough time.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the plurality of initial relative permeability data comprise a plurality of a plurality of initial water relative permeability values and a plurality of initial oil relative permeability values, each of the plurality of initial water relative permeability values corresponding to an initial oil relative permeability value and an initial water saturation level.

A second aspect, combinable with any of the previous aspects, wherein the viscosity data comprise water viscosity data and oil viscosity data.

A third aspect, combinable with any of the previous aspects, wherein determining the flood-front saturation point comprises generating a fractional flow curve based on the viscosity data and the initial relative permeability data; and determining the flood-front saturation point based on the fractional flow curve.

A fourth aspect, combinable with any of the previous aspects, wherein the flood-front saturation point represents an intersection of a tangent line and the fractional flow curve, the tangent line is tangent to the fractional flow curve, and the tangent line passes a point corresponding to a smallest water saturation level.

A fifth aspect, combinable with any of the previous aspects, wherein generating the fractional flow curve comprises calculating a plurality of fractional flow values, wherein calculating each of the plurality of fractional flow values comprises calculating a first product by multiplying the water viscosity data with an initial oil relative permeability data; calculating a second product by multiplying the oil viscosity data with an initial water relative permeability data; calculating a ratio between the first and the second product; calculating an intermediate sum by adding 1 to the ratio; and calculating a factional flow value by taking an inverse of the intermediate sum.

A sixth aspect, combinable with any of the previous aspects, the method includes, for each of a plurality of time steps, repeating determining viscosity data, determining a flood-front saturation point based on the viscosity data and the initial relative permeability data, and generating a plurality of corrected relative permeability data.

The subject matter described in this specification can be implemented in particular implementations so as to realize one or more of the following advantages. The approach may provide a reservoir analyst a robust methodology to construct and calibrate geo-models. By using a set of corrected relative permeability data, larger grid sizes can be used in reservoir simulations. This approach reduces the simulation runtime while providing an accurate prediction of the water break-through time. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 9 is an example illustration of the generation of corrected relative permeability data according to an implementation.

Like reference numbers and designations in the various drawings indicate like elements.

DETAILED DESCRIPTION

The following description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure generally describes methods and systems, including computer-implemented methods, computer program products, and computer systems, for improving water break-through time predictions. Water break-through time is the time at which significant water production begins at a producing well. In some cases, whether the water break-through time predicted by a geo-model matches the historical field results can be one of the key matching indices to evaluate the accuracy of a geo-model.

In some cases, different grid-block sizes can be used during the simulation of a geo-model. The simulation may yield different water break-through time prediction when different grid-block sizes have been used. In some cases, using a bigger geo-model grid-block in a simulation may predict a faster movement of water to the producer. On the other hand, using a smaller grid-block size may predict a slower movement that corresponds better to the historical data. Using a more granular grid-block size may increase the simulation time and the simulation resource significantly. Therefore, large grid-sizes are often used to build geo-models for computational reasons, especially in large reservoirs. However, during the construction of a geo-model, one may not know in advance about the impact of a chosen grid-block size on the flow dynamics during history matching. Therefore, once the geo-model has been finalized, it may be difficult and time consuming to re-do the gridding and layering of the geo-model to use a more granular grid-block size that would yield more accurate results.

Figure 1:
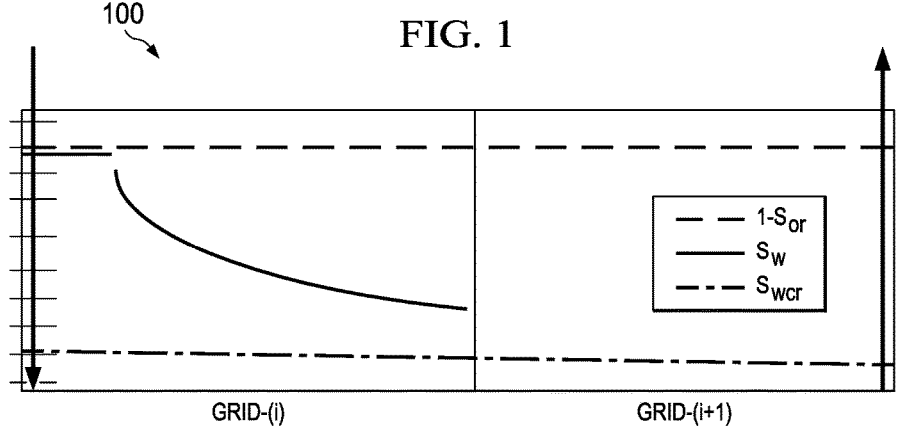
FIG. 1 is a chart illustrating an example water saturation scenario according to an implementation.
Figure 6:
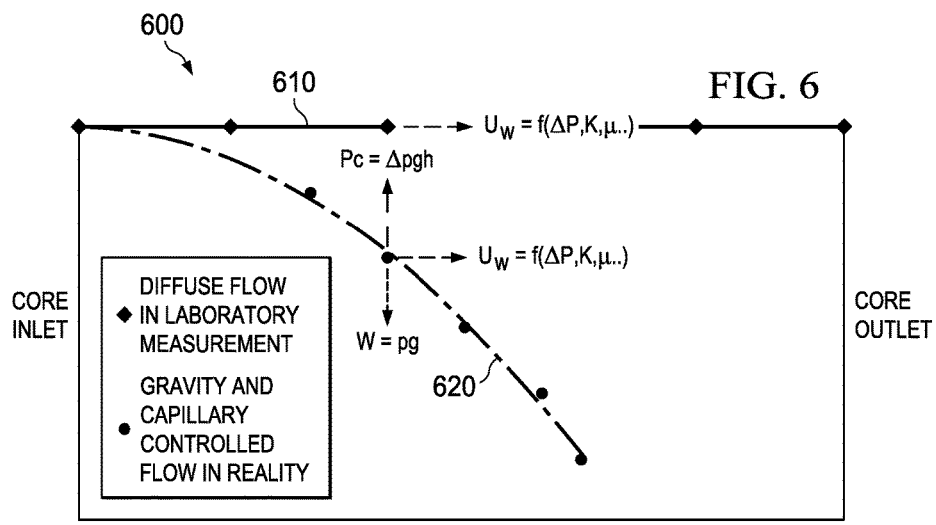
FIG. 6 is a chart illustrating an analysis of different forces impacting the water movement in a reservoir according to an implementation.

FIG. 1 is a chart 100 illustrating an example water saturation scenario according to an implementation. During the injection of water into an oil reservoir, a flood front may be developed. The flood front is the interface between the injected water and the oil that is replaced by the water. The flood front may advance as a function of the interplay between viscous forces (forward movement), gravity (downward movement), and capillary forces (upward movement) experienced by the water. FIG. 6 and associated descriptions provide additional details regarding the viscous forces. This process has been described by the Buckley Leverette theory of frontal advance. In some cases, the Buckley Leverette frontal advance can be reproduced in numerical reservoir simulation by using granular grid-block size. However, as discussed previously, using a small grid-block size may not be practical for simulation runs. Therefore, larger grid-block sizes may be used, which may generate erroneous prediction of the advance of a flood front. The error may increase as the dimension of the grid-block used increases. The error may lead to the prediction of earlier water production and an under-estimation of required water handling capacity in green fields. The error may also lead to a water-cut mismatch in the history matching of brown fields. In some cases, this phenomenon is referred to as numerical dispersion.

In FIG. 1, water saturation is shown in two grids: grid (i) and grid (i+1). Grid (i) includes a wide range of saturation planes. In FIG. 1, $S_w$ represents the water saturation level, $S_{wcr}$ represents the lowest water saturation level at which water becomes mobile, and $S_{or}$ represents the oil saturation level below which oil becomes immobile. As shown in FIG. 1, $S_w$ begins at the maximum water saturation level ($S_w=1-S_{or}$) around the injector. $S_w$ gradually changes from $(1-S_{or})$ to $S_{wcr}$ within grid (i). As shown in FIG. 1, water has not yet moved into grid (i+1) despite the changes in the water saturation level. FIG. 1 illustrates that during a water-oil displacement, it takes some time for displacement front to cover the length of the grid (i) and enter into grid (i+1).

Figure 2:
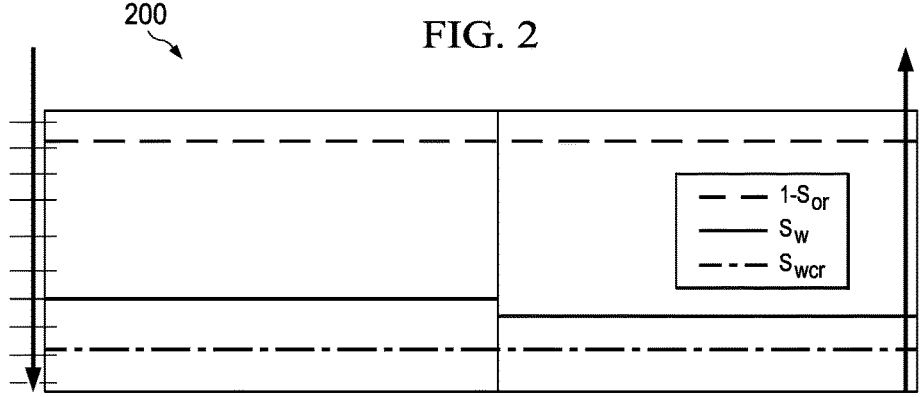
FIG. 2 is a chart illustrating an example water saturation simulation according to an implementation.

FIG. 2 is a chart 200 illustrating an example water saturation simulation according to an implementation. As shown in FIG. 2, water moves directly from grid (i) into grid (i+1) and further into the producer well, while $S_w$ drops to a level close to $S_{wcr}$ in grid (i). This illustrates that during a water-oil displacement in a simulation, water is simulated to automatically move into grid (i+1) as soon as the water saturation in grid (i) becomes greater than $S_{wcr}$ because of the transmissibility and the pressure difference across the interface.

Therefore, in a numerical simulation, the size of grid-blocks causes a smearing of the flood-front and makes water move faster than reality. The larger the grid-block sizes used in the simulation, the more severe the flood-front smearing, and therefore the faster the movement of water predicted in simulation compared to reality. Table 1 shows an example comparison of water break-through time using different grid block sizes during simulations.

TABLE 1

| Run | Grid size (ft) | Location_i | Location_j | Distance | Months to break-through |
|---|---|---|---|---|---|
| 1 | 1 | 601 | 2 | 600 | 21 |
| 2 | 10 | 7 | 2 | 600 | 19 |
| 3 | 50 | 13 | 2 | 600 | 19 |
| 4 | 100 | 7 | 2 | 600 | 17 |
| 5 | 200 | 4 | 2 | 600 | 15 |

The simulation is based on a dummy block having 1000 ft. in the x-axis, 150 ft. in the y-axis, and 60 ft. in the z-axis. The grid size for each simulation is 20 ft. in the z-axis and 50 ft. in the y-axis, but different in the x-axis, e.g., 1, 10, 50, 100, and 200 ft., respectively. An injector is placed at the location (1, 2), and the producer was placed 600 ft. away from the injector. The producer is set at a constant liquid production of 200 blpd, and the injector is set at a constant injection of 200 bwpd. The same volume of water was injected in all simulations. As shown in Table 1, using a granular grid size, e.g., 1 ft., the simulation predicts 21 months for water break-through, which matches closely to historical data. However, using a large grid size, e.g., 200 ft., the simulation predicts 15 months for water break-through, which is faster by 6 months.

Figure 3:
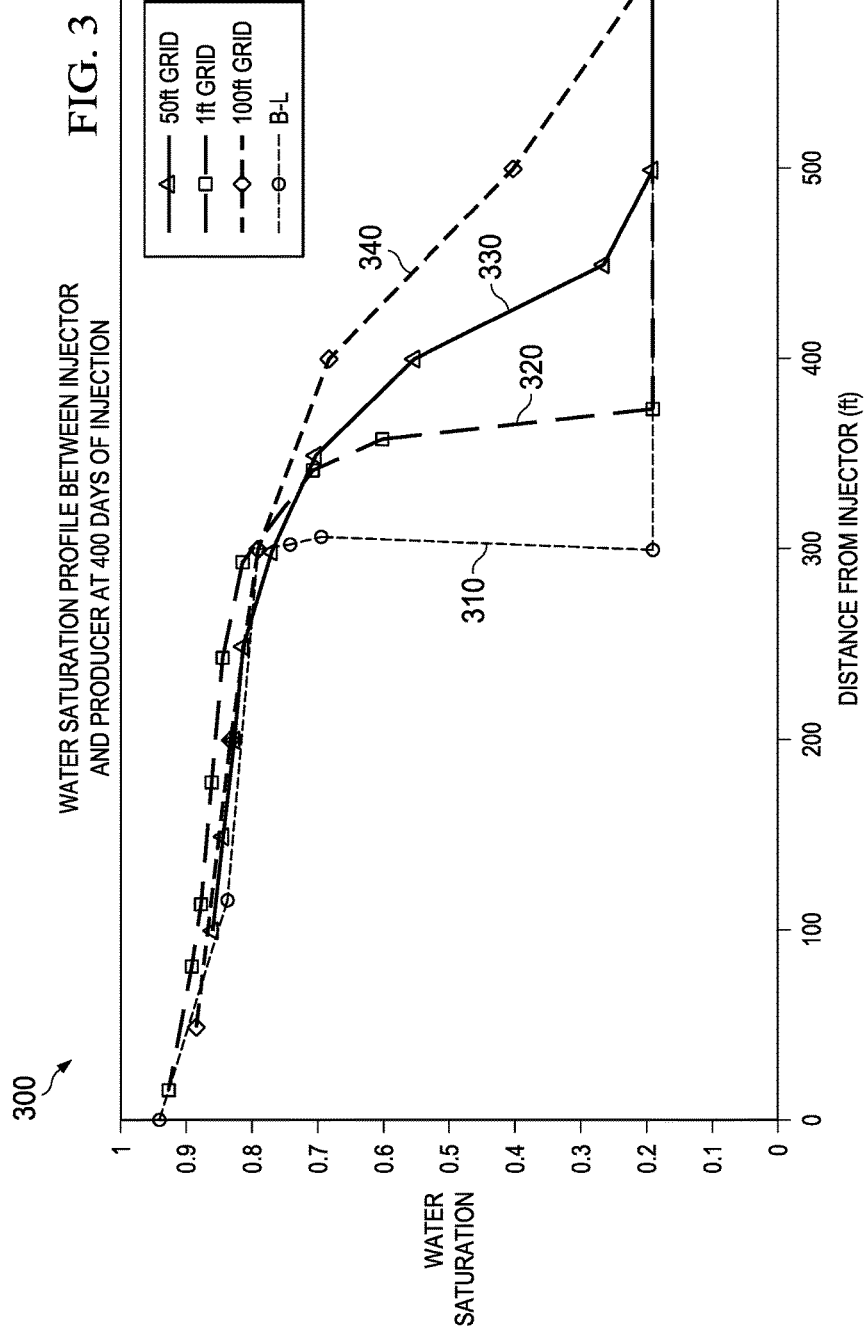
FIG. 3 is a chart illustrating example water saturation profiles based on simulations according to an implementation.

FIG. 3 is a chart 300 illustrating example water saturation profiles based on simulations according to an implementation. The chart 300 includes curves 310, 320, 330, and 340 that show water saturation profile after 400 days of injection. The curve 310 represents the water saturation profile using theoretical analysis based on the Buckley-Leverette model. The curves 320, 330, and 340 represent the water saturation profiles based on simulations that use grid-sizes of 1 ft., 50 ft., and 100 ft., respectively. As shown in FIG. 3, curve 310 indicates a sharp-front of $S_w=0.69$ at a distance of 300 ft. Curve 320 indicates a sharp-front of $S_w=0.69$ at a distance of about 340 ft. Therefore, the simulation using 1 ft. grid size yields a result closer to theoretical analysis. On the other hand, curve 330 indicates a front of $S_w=0.4$ at 500 ft., which is far away from the theoretical prediction.

In some cases, differences in other dimensions, e.g., the vertical layering size ($\Delta z$), may also yield different predictions of water break-through time. While reducing vertical layering size may better capture the vertical heterogeneities, increasing layering on the vertical direction may also introduce artifacts during simulation. For example, for a single-layer model, the shape of the water-cut profile at break-through is almost vertical, which may indicate that water arrives at the well suddenly. As the number of vertical layers increase, the flood-front may become smeared and the arrival of water may become gradual and staggered, which may reflect different water arrival for each of the layers.

In some cases, relative permeability data can be used in the simulation of a geo-model. The relative permeability data can represent the characteristics of a water-oil displacement process. In some cases, the relative permeability data used in a geo-model simulation can be generated in laboratory experiments. In some cases, the relative permeability data can be corrected before being used in a geo-model simulation. A simulation run using a large grid-block size based on the corrected relative permeability data may yield a similar water break-through time prediction as a simulation using smaller grid-block sizes. Therefore, correcting relative permeability data may reduce the construction and simulation time of a geo-model while generating accurate simulation results.

Figure 4:
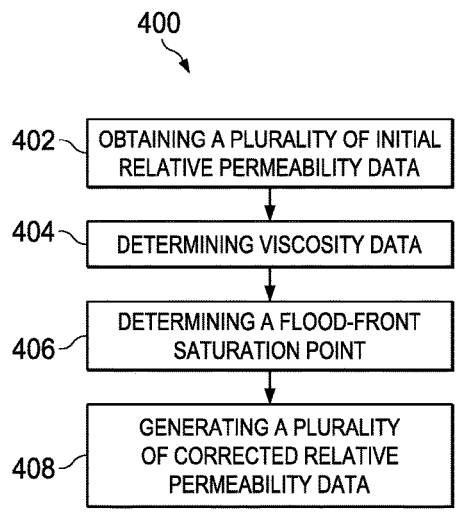
FIG. 4 illustrates an example method for correcting permeability data according to an implementation.

FIG. 4 illustrates an example method 400 for correcting permeability data according to an implementation. For clarity of presentation, the description that follows generally describes method 400 in the context of FIGS. 1-3 and 5-9. However, it should be understood by those of ordinary skill in the art that method 400 may be performed, for example, by any other suitable system, environment, software, and hardware, or a combination of systems, environments, software, and hardware as appropriate. In some implementations, various steps of method 400 can be run in parallel, in combination, in loops, and/or in any order.

At 402, a set of initial relative permeability data is obtained. In some cases, the set of initial relative permeability data can include a set of initial water saturation levels, a set of initial water relative permeability values, and a set of initial oil relative permeability values. Each initial water saturation level in the set corresponds to a respective initial water relative permeability value and a respective initial oil relative permeability value.

In some cases, the initial relative permeability data can be obtained through measurements during laboratory experiments. For example, in a steady state approach, water and oil can be injected into a core plug at one end of the plug. The outflow quantities of water and oil are measured at the other end to determine the initial water relative permeability value and an initial oil relative permeability value at different water saturation levels. In some cases, the experimental data can also be processed using polynomial equation fitting to generate the initial relative permeability data. Table 2 includes an example set of initial relative permeability data determined from laboratory experiments.

TABLE 2

| Saturation levels (Sw) | Initial water relative permeability values (Krw) | Initial oil relative permeability values (Kro) |
|---|---|---|
| 0.19 | 0 | 1 |
| 0.2 | 0.001 | 0.9 |

TABLE 2-continued

| Saturation levels (Sw) | Initial water relative permeability values (Krw) | Initial oil relative permeability values (Kro) |
|---|---|---|
| 0.24 | 0.0015 | 0.8524 |
| 0.29 | 0.0061 | 0.7187 |
| 0.34 | 0.0138 | 0.6217 |
| 0.3912 | 0.0245 | 0.4912 |
| 0.4411 | 0.0383 | 0.3964 |
| 0.491 | 0.0551 | 0.3135 |
| 0.541 | 0.075 | 0.2419 |
| 0.5909 | 0.098 | 0.1812 |
| 0.6409 | 0.124 | 0.1307 |
| 0.6908 | 0.1531 | 0.0897 |
| 0.7408 | 0.1553 | 0.0576 |
| 0.7921 | 0.2205 | 0.0336 |
| 0.842 | 0.2588 | 0.016 |
| 0.9419 | 0.3446 | 0.0014 |
| 1 | 1 | 0 |

In some cases, the set of initial relative permeability data can be stored in a computing storage device and retrieved by the data processing apparatus to perform method 400. In some cases, the set of initial relative permeability data can be inputted to the data processing apparatus by a data input device, an administrator, or any other entities.

From 402, the method 400 proceeds to 404, where viscosity data corresponding to the current reservoir pressure is determined. In some cases, the viscosity data can include water viscosity data and oil viscosity data. In some cases, the viscosity data, e.g., the oil viscosity data, may vary when the pressure of the reservoir is different. In these cases, a set of predetermined viscosity data can be obtained. Each viscosity data in the set can correspond to a different reservoir pressure level. The viscosity data corresponding to the current reservoir pressure can be determined by comparing the current reservoir pressure with the reservoir pressure levels corresponding to the predetermined viscosity data. If the current reservoir pressure matches one of the reservoir pressure levels, then the predetermined viscosity data corresponding to the matched reservoir pressure level can be used. If the current reservoir pressure does not match any of the reservoir pressure levels, then the two reservoir pressure levels that bracket the current reservoir pressure can be identified. The viscosity data can then be determined by extrapolating from the predetermined viscosity data corresponding to the two identified reservoir pressure levels.

From 404, the method 400 proceeds to 406, where a flood-front saturation point is determined. In some cases, the flood saturation point can be determined based on a fractional flow curve. The fractional flow curve can be generated based on a plurality of fractional flow values. Each fractional flow value represents a fraction of water in total liquid, also referred to as the water-liquid ratio. In some cases, each fractional flow value can be calculated based on a respective initial water relative permeability data and a respective initial oil relative permeability data. In some implementations, the following equation can represent an example calculation of a fractional flow value:

$$f_w = \frac{1}{1 + \frac{\mu_w * \kappa_{ro}}{\mu_o * \kappa_{rw}}} \qquad (1)$$

where $\mu_w$ represents the water viscosity data, $\mu_o$ represents the oil viscosity data, $\kappa_{ro}$ and $\kappa_{rw}$ represent an initial oil relative permeability data and an initial water relative permeability data corresponding to a water saturation level, respectively, and $f_w$ represents the fractional flow value for the water saturation level.

In some cases, the calculation described in equation (1) is performed to offset the predominant influence of viscous forces observed in the laboratory experiments that generate the initial relative permeability data. For example, FIG. 6 is a chart 600 illustrating an analysis of different forces impacting the water movement in a reservoir according to an implementation. The chart 600 includes a curve 610 representing water movement in a laboratory experiment and a curve 620 representing water movement in an actual reservoir.

As shown in FIG. 6, due to the high flowrate of oil and water injected into a small plug used in laboratory experiments, the water movement is predominantly influenced by the diffuse flow caused by the viscous (forward) forces. The gravity (downwards) forces and the capillary (upwards) forces provide little or no impact. A particle of water at an inlet would travel directly to an exit, neither dropping in height under gravity nor increasing in height due to capillary equilibrium.

However, in an actual reservoir, a particle of water at the inlet would have a projectile pathway, e.g., similar to the curve 620. The particle of water may move forward while dropping in height as a function of the resultant of the gravity (downward) and capillary (upward) pulls. The gravity and capillary forces may work against the viscous forces to delay the movement of water from entry to exit. These forces may have less substantial impacts in a laboratory experiment. Therefore, the initial relative permeability data generated in the laboratory experiments may be corrected before being used in geo-model simulations. In some cases, the fractional flow approach described below can be used to correct the initial relative permeability data.

Figure 7:
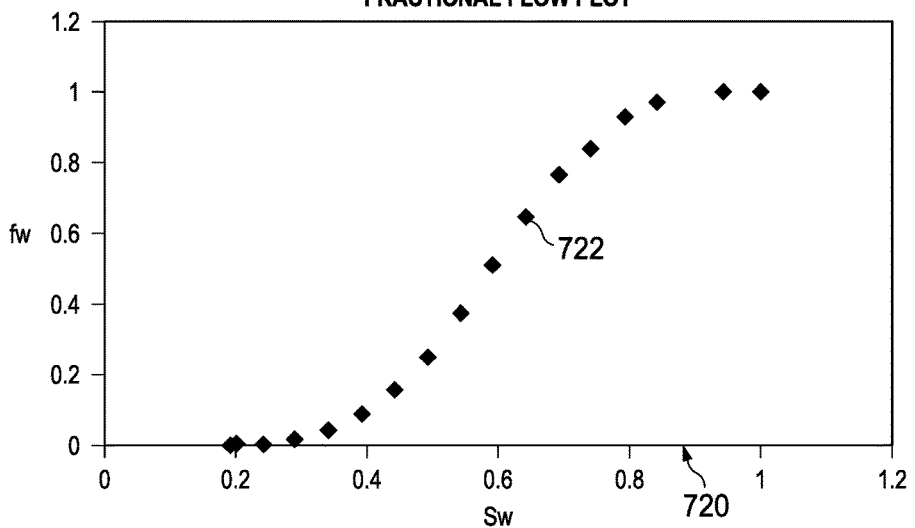
FIG. 7 is an example illustration of the generation of a fractional flow curve according to an implementation.

FIG. 7 is an example illustration 700 of the generation of a fractional flow curve according to an implementation. The example illustration 700 includes a table 710 and a chart 720. The table 710 includes a set of fractional flow values calculated using the equation (1). In table 710, the $S_w$ column lists a set of water saturation levels. The $K_{rw}$ and $K_{rn}$ columns list a set of initial water relative permeability values and initial oil relative permeability values, Respectively. The $f_w$ column lists a set of fractional flow values. Each fractional flow value is calculated using a respective initial water relative permeability value and a respective initial oil relative permeability value in the same row. The water viscosity used for the calculation is 0.31, and the oil viscosity used for the calculation is 0.594.

The chart 720 shows a fractional flow curve 722 generated based on the fractional flow values in the table 710. The fractional flow curve 722 is generated by plotting a set of fraction flow points on a 2-dimensional plane. The x-value of a fraction flow point represents the water saturation level, and the y-value of the faction flow point represents the fraction flow value in the table 710 that corresponds to the water saturation level.

Figure 8:
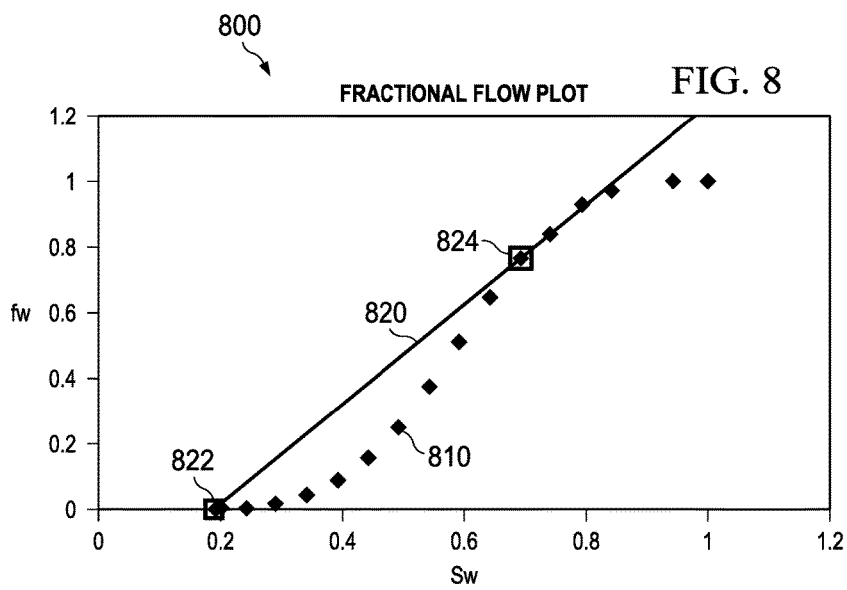
FIG. 8 is a chart illustrating an example flood front saturation point determined according to an implementation.

In some cases, a flood-front saturation point can be determined based on the fractional flow curve. For example, FIG. 8 is a chart 800 illustrating an example flood-front saturation point determined according to an implementation. The chart 800 includes a fractional flow curve 810. The fractional flow curve 810 includes an initial point 822. The initial point 822 corresponds to the smallest water saturation levels used in generating the fractional flow curve 810. As shown in FIG. 8, the initial point 822 represents a water saturation level of about 0.2, and the respective fractional flow value of about 0.

The chart 800 also includes a tangent line 820. The tangent line 820 is a line that passes the initial point 822 and is tangent to the fractional flow curve 810. As shown in FIG. 8, the tangent line 820 intersects the fractional flow curve 810 at a point 824. The point 824 is therefore the flood-front saturation point. As shown in FIG. 8, the flood-front saturation point represents a water saturation level of about 0.68, and the respective fractional flow value of about 0.77.

Returning to FIG. 4, from 406, the method 400 proceeds to 408. At 408, a plurality of corrected relative permeability data is generated. In some cases, the plurality of corrected relative permeability data can be generated based on the plurality of initial relative permeability data and the flood front saturation point determined at 406.

FIG. 9 is an example illustration 900 of the generation of corrected relative permeability data according to an implementation. The example illustration 900 includes charts 910 and 920. The chart 910 illustrates the initial relative permeability data before the correction. The chart 910 includes an initial water relative permeability curve 912 that plots a set of initial water relative permeability values corresponding to different water saturation levels. The chart 910 also includes an initial oil relative permeability curve 914 that plots a set of initial oil relative permeability values corresponding to these water saturation levels.

The chart 920 illustrates the relative permeability data after the correction. The chart 920 includes a water saturation point 928. The water saturation point 928 represents the water saturation level corresponding to the flood-front saturation point determined at 406. As shown in FIG. 9, the water saturation level corresponding to the water saturation point 928 is about 0.68. Therefore, water may become mobile after the water saturation level reaches 0.68. Accordingly, the water relative permeability values corresponding to water saturation levels that are smaller than 0.68 should be set to 0. The chart 920 includes a corrected water relative permeability curve 922 that plots a set of corrected water relative permeability values corresponding to different water saturation levels. The corrected water relative permeability curve 922 shows that the water relative permeability values corresponding to water saturation levels smaller than 0.68 are set to 0, and the water relative permeability values corresponding to water saturation levels greater than or equal to 0.68 are set to the corresponding initial water relative permeability values. The chart 920 also includes an initial oil relative permeability curve 924 that plots a set of corrected oil relative permeability values, which are unchanged from the initial oil relative permeability values.

The corrected relative permeability data can be used to simulate the water break-through time in a reservoir. A simulation run using a large grid size, e.g., 500 ft., based on the corrected relative permeability data, can yield a similar water break-through time prediction result as a simulation run using a smaller grid size, e.g., 1 ft.

In some cases, the steps 404, 406, and 408 can be repeated for different time steps. In some cases, at each time step, the reservoir pressure may change. Therefore, for each time step, different viscosity data, e.g., the water viscosity data and the oil viscosity data, can be determined based on the reservoir pressure at the current time step. A set of fractional flow values can be generated based on the viscosity data determined for the current time step, and the corrected relative permeability data for the current time step can be generated accordingly. In some cases, because the water viscosity may not value significantly, only the oil viscosity data may be determined for each time step. In some cases, to save the simulation run time, the same viscosity data, e.g., the water viscosity data and the oil viscosity data determined at the initial time step, may be used for other time steps throughout the simulation run. In these or other cases, the corrected relative permeability data for the simulation run can be generated and used throughout the simulation run.

Figure 5:
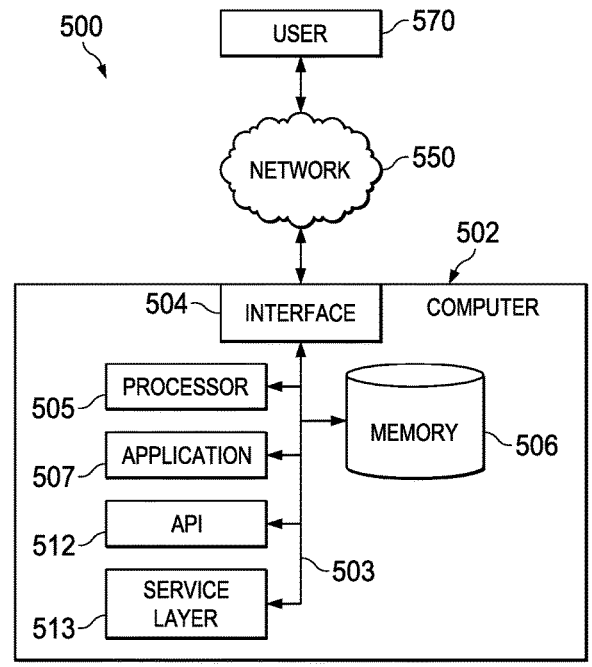
FIG. 5 is a high-level architecture block diagram of a relative permeability data correction processing system according to an implementation.

FIG. 5 is a high-level architecture block diagram of a relative permeability data correction processing system 500 according to an implementation. At a high level, the illustrated system 500 includes a user 570 that is communicably coupled with a relative permeability data correction processing computer 502 through a network 530. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The user 570 represents a person, an application, set of applications, software, software modules, hardware, or combination thereof that can perform a relative permeability data correction. For example, the user 570 can be a reservoir analyst in a company that is responsible for reservoir modeling.

The network 530 facilitates communications between the components of the system 500 (e.g., between the user 570 and the relative permeability data correction processing computer 502). In some cases, the user 570 can access the relative permeability data correction processing computer 502 from a remote network. In these or other cases, the network 530 can be a wireless or a wireline network. In some cases, the user 570 can access the relative permeability data correction processing computer 502 locally. In these or other cases, the network 530 can also be a memory pipe, a hardware connection, or any internal or external communication paths between the components.

The relative permeability data correction processing computer 502 includes a computing system configured to correct relative permeability data. In some cases, the algorithm of the relative permeability data correction process can be implemented in an executable computing code, e.g., C/C++ executable codes. Alternatively or in combination, the algorithm of the relative permeability data correction process can be implemented in an application program, e.g., EXCEL. In some cases, the relative permeability data correction processing computer 502 can include a standalone Linux system that runs batch applications. In some cases, the relative permeability data correction processing computer 502 can include mobile or personal computers that run the application program.

The computer 502 may comprise a computer that includes an input device, such as a keypad, keyboard, touch screen, microphone, speech recognition device, other device that can accept user information, and/or an output device that conveys information associated with the operation of the computer 502, including digital data, visual and/or audio information, or a GUI.

The computer 502 can serve as a client, network component, a server, a database or other persistency, and/or any other component of the system 500. In some implementations, one or more components of the computer 502 may be configured to operate within a cloud-computing-based environment.

At a high level, the computer 502 is an electronic computing device operable to receive, transmit, process, store, or manage data and information associated with the system 500. According to some implementations, the computer 502 may also include or be communicably coupled with an application server, e-mail server, web server, caching server, streaming data server, business intelligence (BI) server, and/or other server.

The computer 502 can receive requests over network 530 from a client application (e.g., executing on another computer 502) and respond to the received requests by processing the said requests in an appropriate software application. In addition, requests may also be sent to the computer 502 from internal users (e.g., from a command console or by another appropriate access method), external or third parties, other automated applications, as well as any other appropriate entities, individuals, systems, or computers.

Each of the components of the computer 502 can communicate using a system bus 503. In some implementations, any and/or all the components of the computer 502, both hardware and/or software, may interface with each other and/or the interface 504 over the system bus 503 using an application programming interface (API) 512 and/or a service layer 513. The API 512 may include specifications for routines, data structures, and object classes. The API 512 may be either computer language-independent or -dependent and refer to a complete interface, a single function, or even a set of APIs. The service layer 513 provides software services to the computer 502 and/or the system 500. The functionality of the computer 502 may be accessible for all service consumers using this service layer. Software services, such as those provided by the service layer 513, provide reusable, defined business functionalities through a defined interface. For example, the interface may be software written in JAVA, C++, or other suitable language providing data in Extensible Markup Language (XML) format or other suitable format. While illustrated as an integrated component of the computer 502, alternative implementations may illustrate the API 512 and/or the service layer 513 as stand-alone components in relation to other components of the computer 502 and/or system 500. Moreover, any or all parts of the API 512 and/or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502 and/or system 500. The interface 504 is used by the computer 502 for communicating with other systems in a distributed environment—including within the system 500—connected to the network 530 (whether illustrated or not). Generally, the interface 504 comprises logic encoded in software and/or hardware in a suitable combination and operable to communicate with the network 530. More specifically, the interface 504 may comprise software supporting one or more communication protocols associated with communications such that the network 530 or interface's hardware is operable to communicate physical signals within and outside of the illustrated system 500.

The computer 502 includes a processor 505. Although illustrated as a single processor 505 in FIG. 5, two or more processors may be used according to particular needs, desires, or particular implementations of the computer 502 and/or the system 500. Generally, the processor 505 executes instructions and manipulates data to perform the operations of the computer 502. Specifically, the processor 505 executes the functionality required for correcting relative permeability data. In some cases, the processor 505 can include a data processing apparatus.

The computer 502 also includes a memory 506 that holds data for the computer 502 and/or other components of the system 500. Although illustrated as a single memory 506 in FIG. 5, two or more memories may be used according to particular needs, desires, or particular implementations of the computer 502 and/or the system 500. While memory 506 is illustrated as an integral component of the computer 502, in alternative implementations, memory 506 can be external to the computer 502 and/or the system 500.

The application 507 is an algorithmic software engine providing functionality according to particular needs, desires, or particular implementations of the computer 502 and/or the system 500, particularly with respect to functionality required for correcting relative permeability data. For example, application 507 can serve as one or more components/applications described in FIGS. 1-4 and 6-9. Further, although illustrated as a single application 507, the application 507 may be implemented as multiple applications 507 on the computer 502. In addition, although illustrated as integral to the computer 502, in alternative implementations, the application 507 can be external to the computer 502 and/or the system 500.

There may be any number of computers 502 associated with, or external to, the system 500 and communicating over network 530. Further, the terms "client," "user," and other appropriate terminology may be used interchangeably as appropriate without departing from the scope of this disclosure. Moreover, this disclosure contemplates that many users may use one computer 502, or that one user may use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A method for correcting relative permeability data used in a reservoir simulation, comprising:
obtaining, by a hardware data processing apparatus, a plurality of initial relative permeability data, wherein the plurality of initial relative permeability data comprise a plurality of initial water relative permeability values and a plurality of initial oil relative permeability values, each of the plurality of initial water relative permeability values corresponding to an initial oil relative permeability value and an initial water saturation level;
determining, by the hardware data processing apparatus, viscosity data;
determining, by the hardware data processing apparatus, a flood-front saturation point based on the viscosity data and the initial relative permeability data;
generating, by the hardware data processing apparatus, a plurality of corrected relative permeability data based on the plurality of initial relative permeability data and the flood-front saturation point, wherein the generating the plurality of corrected relative permeability data comprises:
for each of the plurality of initial relative permeability data:
comparing the initial water relative permeability value of the initial relative permeability data with the flood-front saturation point;
if the initial water relative permeability value is smaller than the flood-front saturation point, setting a corresponding corrected water relative permeability value to zero; and
if the initial water relative permeability value is greater than or equal to the flood-front saturation point, setting the corresponding corrected water relative permeability value to the initial water relative permeability value; and
simulating water break-through time using the plurality of the corrected relative permeability data.

2. The method of claim 1, wherein the viscosity data comprise water viscosity data and oil viscosity data.

3. The method of claim 1, wherein determining the flood-front saturation point comprises:
generating a fractional flow curve based on the viscosity data and the initial relative permeability data; and
determining the flood-front saturation point based on the fractional flow curve.

4. The method of claim 3, wherein the flood-front saturation point represents an intersection of a tangent line and the fractional flow curve, the tangent line is tangent to the fractional flow curve, and the tangent line passes a point corresponding to a smallest water saturation level.

5. The method of claim 3, wherein generating the fractional flow curve comprises:
calculating a plurality of fractional flow values, wherein calculating each of the plurality of fractional flow values comprises:
calculating a first product by multiplying water viscosity data with an initial oil relative permeability data;
calculating a second product by multiplying oil viscosity data with an initial water relative permeability data;
calculating a ratio between the first and the second product;
calculating an intermediate sum by adding 1 to the ratio; and
calculating a factional flow value by taking an inverse of the intermediate sum.

6. The method of claim 1, for each of a plurality of time steps, repeating determining viscosity data, determining a flood-front saturation point based on the viscosity data and the initial relative permeability data, and generating a plurality of corrected relative permeability data.

7. A system for correcting relative permeability data used in a reservoir simulation, comprising:
a memory; and
at least one hardware processor interoperably coupled with the memory and configured to:
obtain a plurality of initial relative permeability data, wherein the plurality of initial relative permeability data comprise a plurality of initial water relative permeability values and a plurality of initial oil relative permeability values, each of the plurality of initial water relative permeability values corresponding to an initial oil relative permeability value and an initial water saturation level;
determine viscosity data;
determine a flood-front saturation point based on the viscosity data and the initial relative permeability data;
generate a plurality of corrected relative permeability data based on the plurality of initial relative permeability data and the flood-front saturation point, wherein the generating the plurality of corrected relative permeability data comprises:
for each of the plurality of initial relative permeability data:
comparing the initial water relative permeability value of the initial relative permeability data with the flood-front saturation point;
if the initial water relative permeability value is smaller than the flood-front saturation point, setting a corresponding corrected water relative permeability value to zero; and
if the initial water relative permeability value is greater than or equal to the flood-front saturation point, setting the corresponding corrected water relative permeability value to the initial water relative permeability value; and
simulate water break-through time using the plurality of the corrected relative permeability data.

8. The system of claim 7, wherein the viscosity data comprise water viscosity data and oil viscosity data.

9. The system of claim 7, wherein determining the flood-front saturation point comprises:
generating a fractional flow curve based on the viscosity data and the initial relative permeability data; and
determining the flood-front saturation point based on the fractional flow curve.

10. The system of claim 9, wherein the flood-front saturation point represents an intersection of a tangent line and the fractional flow curve, the tangent line is tangent to the fractional flow curve, and the tangent line passes a point corresponding to a smallest water saturation level.

11. The system of claim 9, wherein generating the fractional flow curve comprises:
calculating a plurality of fractional flow values, wherein calculating each of the plurality of fractional flow values comprises:
calculating a first product by multiplying water viscosity data with an initial oil relative permeability data;
calculating a second product by multiplying oil viscosity data with an initial water relative permeability data;
calculating a ratio between the first and the second product;
calculating an intermediate sum by adding 1 to the ratio; and
calculating a factional flow value by taking an inverse of the intermediate sum.

12. The system of claim 7, wherein the at least one hardware processor is further configured to:
for each of a plurality of time steps, repeat determining viscosity data, determining a flood-front saturation point based on the viscosity data and the initial relative permeability data, and generating a plurality of corrected relative permeability data.

13. A non-transitory, computer-readable medium storing computer-readable instructions, the instructions executable by a computer and configured to:
obtain a plurality of initial relative permeability data, wherein the plurality of initial relative permeability data comprise a plurality of initial water relative permeability values and a plurality of initial oil relative permeability values, each of the plurality of initial water relative permeability values corresponding to an initial oil relative permeability value and an initial water saturation level;
determine viscosity data;
determine a flood-front saturation point based on the viscosity data and the initial relative permeability data;
generate a plurality of corrected relative permeability data based on the plurality of initial relative permeability data and the flood-front saturation point, wherein the generating the plurality of corrected relative permeability data comprises:
for each of the plurality of initial relative permeability data:
comparing the initial water relative permeability value of the initial relative permeability data with the flood-front saturation point;
if the initial water relative permeability value is smaller than the flood-front saturation point, setting a corresponding corrected water relative permeability value to zero; and
if the initial water relative permeability value is greater than or equal to the flood-front saturation point, setting the corresponding corrected water relative permeability value to the initial water relative permeability value; and
simulate water break-through time using the plurality of the corrected relative permeability data.

14. The non-transitory, computer-readable medium of claim 13, wherein the viscosity data comprise water viscosity data and oil viscosity data.

15. The non-transitory, computer-readable medium of claim 13, wherein determining the flood-front saturation point comprises:
generating a fractional flow curve based on the viscosity data and the initial relative permeability data; and
determining the flood-front saturation point based on the fractional flow curve.

16. The non-transitory, computer-readable medium of claim 15, wherein the flood-front saturation point represents an intersection of a tangent line and the fractional flow curve, the tangent line is tangent to the fractional flow curve, and the tangent line passes a point corresponding to a smallest water saturation level.

17. The non-transitory, computer-readable medium of claim 15, wherein generating the fractional flow curve comprises:
calculating a plurality of fractional flow values, wherein calculating each of the plurality of fractional flow values comprises:
calculating a first product by multiplying water viscosity data with an initial oil relative permeability data;
calculating a second product by multiplying oil viscosity data with an initial water relative permeability data;
calculating a ratio between the first and the second product;
calculating an intermediate sum by adding 1 to the ratio; and
calculating a factional flow value by taking an inverse of the intermediate sum.

18. The non-transitory, computer-readable medium of claim 13, wherein the instructions are configured to:
for each of a plurality of time steps, repeat determining viscosity data, determining a flood-front saturation point based on the viscosity data and the initial relative permeability data, and generating a plurality of corrected relative permeability data.

* * * * *